United States Patent
Yamana

(10) Patent No.: US 9,556,816 B2
(45) Date of Patent: Jan. 31, 2017

(54) SYSTEM FOR CONTROLLING COMBUSTION CONDITION IN VEHICLE ENGINE

(71) Applicant: SUZUKI MOTOR CORPORATION, Shizuoka (JP)

(72) Inventor: Shunsuke Yamana, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 930 days.

(21) Appl. No.: 13/896,788

(22) Filed: May 17, 2013

(65) Prior Publication Data

US 2013/0327299 A1  Dec. 12, 2013

(30) Foreign Application Priority Data

Jun. 7, 2012 (JP) ................. 2012-130089

(51) Int. Cl.
*F02D 41/30* (2006.01)
*F02D 41/00* (2006.01)
(Continued)

(52) U.S. Cl.
CPC ............. *F02D 41/30* (2013.01); *F02D 35/027* (2013.01); *F02D 41/008* (2013.01); *F02D 41/34* (2013.01); *Y02T 10/44* (2013.01)

(58) Field of Classification Search
CPC ............... B60W 2030/206; B60W 2040/1392; F02D 33/003; F02D 33/006; F02D 35/027; F02D 41/0085; F02D 41/1497; F02D 41/1498; F02D 41/30; F02D 2200/02; F02M 2700/1394
See application file for complete search history.

(56) References Cited

U.S. PATENT DOCUMENTS 5,353,764 A * 10/1994 Tomisawa ............. F02D 35/023
                                                    123/435
6,044,824 A *  4/2000 Mamiya ................ F02D 41/008
                                                    123/491
(Continued)

FOREIGN PATENT DOCUMENTS

JP  56-66454 A  6/1981
JP  59-23037 A  2/1984
(Continued)

OTHER PUBLICATIONS

Machine Translation of JP07-279736.*
(Continued)

*Primary Examiner* — Erick Solis
*Assistant Examiner* — Anthony L Bacon
(74) *Attorney, Agent, or Firm* — Rothwell, Figg, Ernst & Manbeck, P.C.

(57) ABSTRACT

In a system, a fuel supply increasing unit increases, upon determination that abnormal combustion takes place in at least one cylinder, a quantity of fuel to be supplied into the at least one cylinder in comparison to a quantity of fuel to be supplied into the same cylinder in which no abnormal combustion takes place. A vibration determiner determines whether a level of vibrations of a vehicle has reached a predetermined level. A disabling unit disables, upon determination that the level of vibrations of the vehicle has reached the predetermined level while the fuel supply increasing unit is increasing the quantity of fuel to be supplied into the at least one cylinder, the fuel supply increasing unit from increasing the quantity of fuel to be supplied into the at least one cylinder.

14 Claims, 6 Drawing Sheets

(51) Int. Cl.
F02D 41/34 (2006.01)
F02D 35/02 (2006.01)

(56) References Cited

U.S. PATENT DOCUMENTS

| | | | |
|---|---|---|---|
| 7,174,879 B1* | 2/2007 | Chol | F02D 31/002 |
| | | | 123/406.11 |
| 8,683,976 B2 | 4/2014 | Cunningham et al. | |
| 2007/0089697 A1* | 4/2007 | Hara | F02D 35/023 |
| | | | 123/90.15 |
| 2011/0202260 A1 | 8/2011 | Cunningham et al. | |
| 2013/0282261 A1* | 10/2013 | Yamana | F02D 41/22 |
| | | | 701/111 |

FOREIGN PATENT DOCUMENTS

| | | |
|---|---|---|
| JP | 7-279736 A | 10/1995 |
| JP | 9-112308 A | 4/1997 |
| JP | 10-184430 A | 7/1998 |
| JP | 11-36906 A | 2/1999 |
| JP | 2001-289095 A | 10/2001 |
| JP | 33382771 B2 | 3/2003 |
| JP | 2006-46180 A | 2/2006 |
| JP | 2007-56784 A | 3/2007 |
| JP | 2007-231923 A | 9/2007 |
| JP | 2010-285906 A | 12/2010 |

OTHER PUBLICATIONS

The First Office Action mailed Jun. 12, 2015 in corresponding Chinese Patent Application No. 201310226563.8 (with an English translation) (10 pages).

* cited by examiner

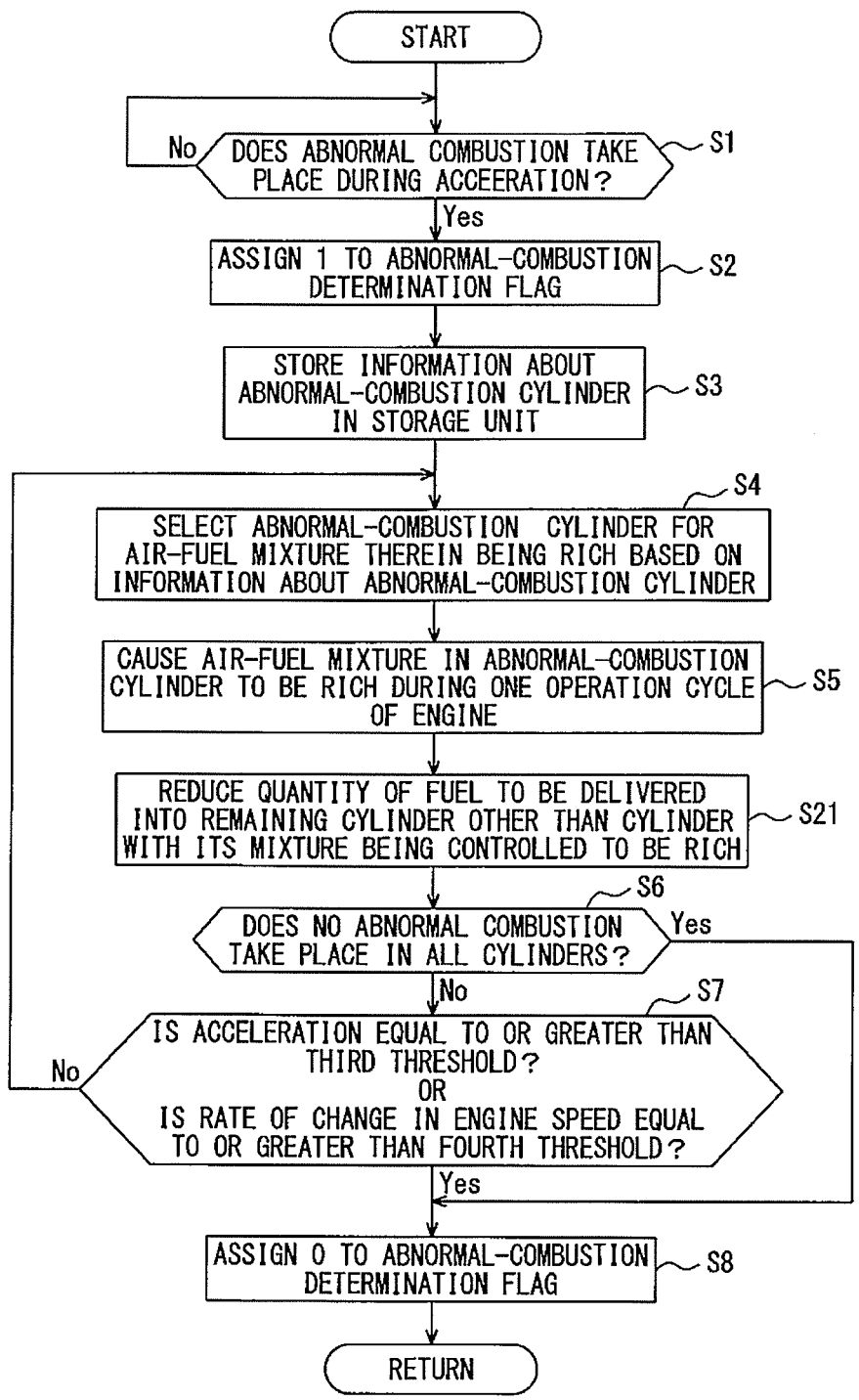

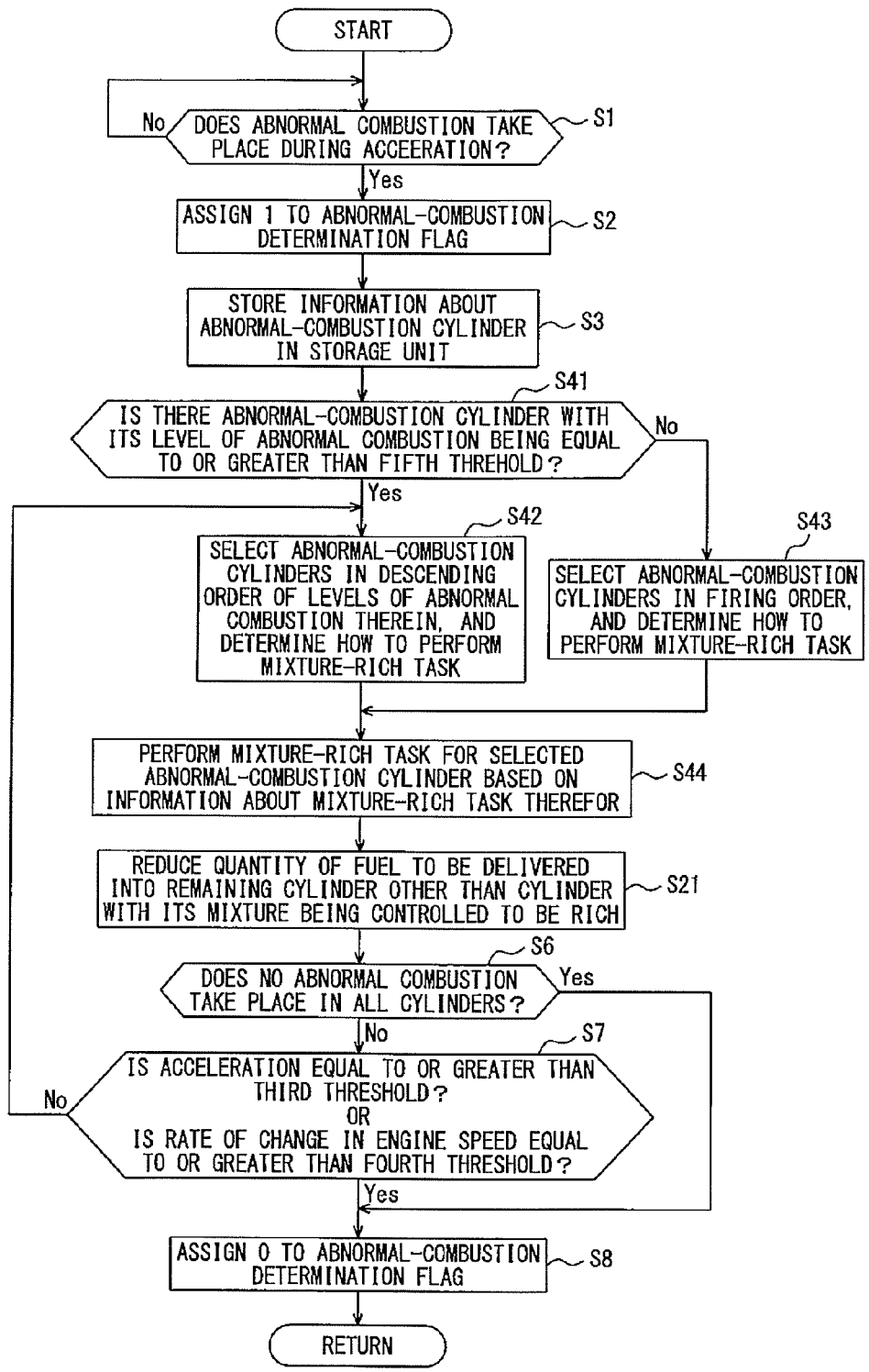

SYSTEM FOR CONTROLLING COMBUSTION CONDITION IN VEHICLE ENGINE

CROSS-REFERENCE TO RELATED APPLICATIONS

This application is based on and claims the benefit of priority from Japanese Patent Application No. 2012-130089 filed on Jun. 7, 2012, the disclosure of which is incorporated in its entirety by reference.

TECHNICAL FIELD

The present invention relates to technologies for controlling combustion conditions in internal combustion engines, referred to simply as engines, for vehicles.

BACKGROUND

There are some technologies to increase the compression ratio in engines for improvement of their fuel economy. A high compression ratio in engines may result in abnormal combustion, such as knocking and pre-ignition, therein. In order to address such a problem, for example, Japanese Patent Application Publication No. H11-36906 discloses a technology that retards, using a VVT (Variable Valve Timing) mechanism, the closing timing of intake valves of an engine according to when detecting knocking or an ion current flowing through an ignition plug. This aims to avoid abnormal combustion in the engine.

However, if the technology disclosed in Patent Publication No. H11-36906 is applied to an engine controlled in harsh operating conditions requiring high compression ratio and high exhaust interference, it may be difficult for only the retardation of the intake-valve closing timing to sufficiently suppress abnormal combustion in the engine operating in a specific environment with a high-temperature coolant and high-temperature intake air in which the engine may be subject to thermal damage.

In addition to the technology disclosed in Patent Publication No. H11-36906, there is another technology that increases a quantity of fuel to be supplied into a cylinder of an engine in which knocking or pre-ignition is determined to occur to cool the interior of the cylinder, thus suppressing abnormal combustion in the cylinder.

For example, Japanese Patent Publication No. 3382771 discloses a technology that increases a quantity of fuel to be supplied into an engine upon rapid drop in the RPM of the engine, operating at full load, i.e. at WOT (Wide Open Throttle), from a high value to a low value. This aims to prevent the occurrence of pre-ignition in the engine.

SUMMARY

However, an increase in a quantity of fuel to be supplied into a cylinder of a vehicle engine in which abnormal combustion is determined to occur may increase vibrations of the engine in comparison to those of a normal-operating engine in which no abnormal combustion occurs. These vibrations may give discomfort to occupants of the vehicle.

In view of the circumstances set forth above, one aspect of the present invention seeks to provide systems for controlling combustion conditions in a vehicle engine, which are designed to address the problems set forth above.

Specifically, an alternative aspect of the present invention aims to provide such systems, each of which is capable of reducing vibrations of a corresponding vehicle engine due to an increase in a quantity of fuel to be supplied into a cylinder of the vehicle engine.

According to an exemplary aspect of the present invention, there is provided a system for controlling a combustion condition in at least one cylinder of an internal combustion engine of a vehicle. The system includes an abnormal combustion determiner configured to determine whether abnormal combustion takes place in the at least one cylinder. The system includes a fuel supply increasing unit configured to increase, upon determination that abnormal combustion takes place in the at least one cylinder, a quantity of fuel to be supplied into the at least one cylinder in comparison to a quantity of fuel to be supplied into the same cylinder in which no abnormal combustion takes place. The system includes a vibration determiner configured to determine whether a level of vibrations of the vehicle has reached a predetermined level. The system includes a disabling unit configured to disable, upon determination that the level of vibrations of the vehicle has reached the predetermined level while the fuel supply increasing unit is increasing the quantity of fuel to be supplied into the at least one cylinder, the fuel supply increasing unit from increasing the quantity of fuel to be supplied into the at least one cylinder.

In a first example of the exemplary aspect of the present invention, the at least one cylinder of the internal combustion engine is a plurality of cylinders in the internal combustion engine, the internal combustion engine has repeated operating cycles, and the abnormal combustion determiner is configured to determine that abnormal combustion takes place in several cylinders, referred to as abnormal-combustion cylinders, in the plurality of cylinders. The fuel supply increasing unit is configured to: sequentially selects one of the abnormal-combustion cylinders in a given order; and increase the quantity of fuel to be supplied into a sequentially selected one the abnormal-combustion cylinders every operating cycle of the internal combustion engine.

In a second example of the exemplary aspect of the present invention, the at least one cylinder is a plurality of cylinders in the internal combustion engine, the vehicle is configured such that each of the plurality of cylinders of the internal combustion engine is communicable to an exhaust manifold, the exhaust manifold is communicably coupled to an exhaust passage, and catalyst is disposed in the exhaust passage. The system further includes a fuel supply reducing unit configured to reduce a quantity of fuel to be supplied into at least one remaining cylinder in the plurality of cylinders other than the selected cylinder into which the quantity of fuel to be supplied is increased by the fuel supply increasing unit, so that an air-fuel ratio of exhaust gas out of the plurality of cylinders in the exhaust passage becomes an ideal air-fuel ratio.

In a third example of the exemplary aspect of the present invention, if the at least one remaining cylinder in the plurality of cylinders other than the selected cylinder is several remaining cylinders thereof other than the selected cylinder, the fuel supply reducing unit is configured to reduce the quantity of fuel to be supplied into each of the several remaining cylinders equally.

In a fourth example of the exemplary aspect of the present invention, the at least one cylinder is a plurality of cylinders in the internal combustion engine, and the abnormal combustion determiner is configured to determine that abnormal combustion takes place in several cylinders, referred to as abnormal-combustion cylinders, in the plurality of cylinders. The system further includes an abnormal-combustion level detector configured to detect a level of abnormal combustion in each of the abnormal-combustion cylinders. The fuel supply increasing unit is configured to increase the quantity of fuel to be supplied into the abnormal-combustion cylinders in one of: a firing order of the abnormal-combustion cylinders of the internal combustion engine; and a descending order of the levels of abnormal combustion detected by the abnormal-combustion level detector.

In a fifth example of the exemplary aspect of the present invention, the system further includes an abnormal-combustion level detector configured to detect a level of abnormal combustion in the at least one cylinder. The fuel supply increasing unit is configured to extend a period to increase the quantity of fuel to be supplied into the at least one cylinder as the level of abnormal combustion in the at least one cylinder detected by the abnormal-combustion level detector increases.

In a sixth example of the exemplary aspect of the present invention, the system further includes a coolant temperature sensor configured to measure a temperature of a coolant in the internal combustion engine. The fuel supply increasing unit is configured to extend a period to increase the quantity of fuel to be supplied into the at least one cylinder as the temperature of the coolant in the internal combustion engine increases.

In a seventh example of the exemplary aspect of the present invention, the system further includes an intake temperature sensor configured to measure a temperature of intake air to the internal combustion engine. The fuel supply increasing unit is configured to extend a period to increase the quantity of fuel to be supplied into the at least one cylinder as the temperature of the intake air increases.

In an eighth example of the exemplary aspect of the present invention, the internal combustion engine has repeated operating cycles, and the fuel supply increasing unit is configured to increase the quantity of fuel to be supplied into the at least one cylinder during continuous several operating cycles of the internal combustion engine, thus extending a period to increase the quantity of fuel to be supplied into the at least one cylinder.

In a ninth example of the exemplary aspect of the present invention, the system further includes an acceleration determiner configured to determine whether an acceleration of the vehicle while the vehicle is running is smaller than a predetermined threshold. Upon determination that the acceleration of the vehicle while the vehicle is running is smaller than the predetermined threshold, the fuel supply increasing unit is configured to avoid an increase in the quantity of fuel to be supplied into the at least one cylinder.

The system according to the exemplary aspect of the present invention increases a quantity of fuel to be supplied to at least one cylinder in which abnormal combustion is determined to take place to thereby increase latent heat of vaporization of fuel therein. This cools the at least one cylinder in which abnormal combustion takes place, resulting in reduction of the duration of abnormal combustion in the at least one cylinder. In addition, the system according to the exemplary aspect of the present invention prevents abnormal combustion from occurring in the same cylinder again.

The system according to the exemplary aspect of the present invention also disables, upon determination that the level of vibrations of the vehicle has reached the predetermined level while the fuel supply increasing unit is increasing the quantity of fuel to be supplied into the at least one cylinder, the fuel supply increasing unit from increasing the quantity of fuel to be supplied into the at least one cylinder. This prevents an increase in the level of the vibrations of the internal combustion engine due to an increase in the supply of fuel into the at least one cylinder, thus preventing the vehicle vibrations from giving discomfort to occupants of the vehicle.

The system according to the first example of the exemplary aspect of the present invention increases a quantity of fuel to be supplied to the abnormal-combustion cylinders separately, thus preventing the air-fuel ration of exhaust gas from being richer than the ideal air-fuel ratio. This maintains at a high level the conversion performance of the catalyst for the exhaust gas.

The system according to the first example of the exemplary aspect of the present invention also increases a quantity of fuel to be supplied to the abnormal-combustion cylinders separately, thus reducing an increase in the fluctuations of the internal combustion engine due to the increase in a quantity of fuel to be supplied to the abnormal-combustion cylinders.

The system according to the second example of the exemplary aspect of the present invention enables the catalyst disposed in the exhaust passage of the internal combustion engine to effectively clean the exhaust gas.

The system according to the third example of the exemplary aspect of the present invention prevents reduction in quantity of fuel from the several remaining cylinders from being unbalanced therebetween, thus preventing an increase in an amount of NOx due to the unbalance in reduction of fuel quantity between the several remaining cylinders.

The system according to the fourth example of the exemplary aspect of the present invention increases a quantity of fuel to be supplied into the abnormal-combustion cylinders in one of: the firing order of the abnormal-combustion cylinders of the internal combustion engine; and the descending order of the levels of abnormal combustion.

The system according to the fifth example of the exemplary aspect of the present invention extends the period to increase the quantity of fuel to be supplied into the at least one cylinder as the level of abnormal combustion in the at least one cylinder increases. This reduces the duration of abnormal combustion in the at least one cylinder depending on the level of abnormal combustion.

The system according to the sixth example of the exemplary aspect of the present invention prevents next abnormal combustion from taking place again in the at least one cylinder after the occurrence of the first abnormal combustion.

The system according to the seventh example of the exemplary aspect of the present invention prevents next abnormal combustion from taking place again in the at least one cylinder after the occurrence of the first abnormal combustion.

The system according to the eighth example of the exemplary aspect of the present invention concentrates an increase in the at least one cylinder even if there are other cylinders in which abnormal combustion is determined to take place. This reduces the duration of abnormal combustion in the at least one cylinder as early as possible.

In the system according to the ninth example of the exemplary aspect of the present invention, because the acceleration of the vehicle while the vehicle is running is smaller than the predetermined threshold, it is determined that the vehicle is under the running condition of the vehicle in which the occupants are sensitive to the variations in a level of the vibrations of the internal combustion engine. Thus, when the vehicle is under the running condition, the system according to the ninth example is configured to avoid an increase in the quantity of fuel to be supplied into the at least one cylinder. This configuration prevents the vibrations of the internal combustion engine due to an increase in a quantity of fuel to be supplied to the at least one cylinder from giving discomfort to occupants of the vehicle.

BRIEF DESCRIPTION OF THE DRAWINGS

Other aspects of the present invention will become apparent from the following description of embodiments with reference to the accompanying drawings in which:

FIG. 5 is a flowchart schematically illustrating an abnormal-combustion suppressing routine carried out by the engine control module illustrated in FIG. 4; and FIG. 6 is a flowchart schematically illustrating an abnormal-combustion suppressing routine carried out by an engine control module according to a third embodiment of the present invention.

DETAILED DESCRIPTION OF EMBODIMENT

Embodiments of the present invention will be described hereinafter with reference to the accompanying drawings.

First Embodiment

A first embodiment of the present invention will be described first.

In the first embodiment, a system for controlling combustion conditions in an internal combustion engine, referred to simply as an engine, will be described.

Figure 1:
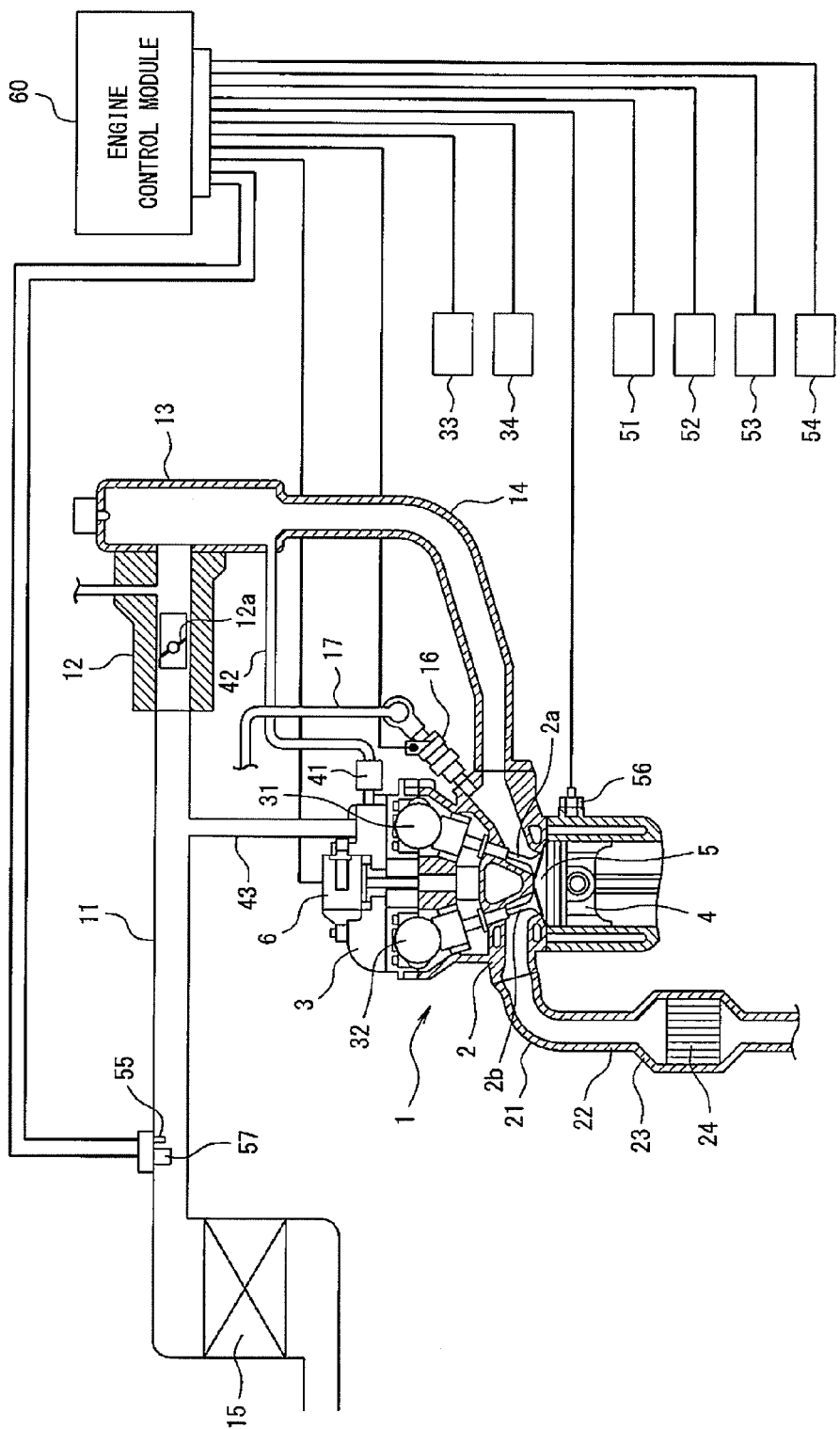
FIG. 1 is a view schematically illustrating a structural example of a vehicle in which a system for controlling combustion conditions in an internal combustion engine is incorporated according to a first embodiment of the present invention.

FIG. 1 schematically illustrates a structural example of a vehicle in which the system for controlling combustion conditions in the engine is incorporated.

Referring to FIG. 1, reference numeral 1 represents the engine. The engine 1 is comprised of a cylinder block, a cylinder head 2, and a cylinder cover 3. The cylinder head 2 is mounted on the top of the cylinder block. In the cylinder block, a plurality of cylinders are fog med. The cylinder cover 3 is mounted on the top of the cylinder head 2 to cover it.

The engine 1 is also comprised of a piston 4 disposed in each of the cylinders to reciprocate. The cylinder head 2 has a bottom surface formed for each cylinder. The space between the head of the piston 4 in each cylinder and the bottom surface of the cylinder head 2 corresponding to the cylinder defines a combustion chamber 5. The piston 4 reciprocating in a cylinder is coupled to a crankshaft (not shown) via a connecting rod. This allows the reciprocating motion of the piston 4 to be converted into the rotary motion of the crankshaft. The rotary motion of the crankshaft serves as output rotary power of the engine 1. In this embodiment, the engine 1 is designed as a four-stroke cycle engine in which the piston 4 completes four separate strokes, i.e. intake, compression, power, and exhaust, during two separate revolutions of the crankshaft.

Reference numeral 60 represents an engine control module (ECM) 60 for controlling the operations of the engine 1. For example, the ECM 60 is operative to control combustion conditions in the combustion chamber 5 of each cylinder.

The combustion chamber 5 of each cylinder communicates via an intake port with an intake manifold 14. An intake valve member 2a is disposed in the cylinder head 2 for each cylinder for opening or closing the intake port of the corresponding cylinder. To the intake manifold 14, an intake pipe 11 is communicably coupled via an electronic-control throttle body 12 and a surge tank 13. Through the intake pipe 11, air is introduced into the engine 1. At an upstream side of the intake pipe 11 an air cleaner 15 is disposed to filter air entering the intake pipe 11 to remove impurities and the like from the air. The electronic-control throttle body 12 is equipped with a throttle valve 12a provided in the intake pipe 11 at the downstream of the air cleaner 15 and at the upstream of the intake manifold 14. The throttle valve 12a is electrically connected to the ECM 60 and operative to control the amount of air entering the intake manifold 14 under control by the ECM 60. In this embodiment, the intake pipe 11, the electronic-control throttle body 12, the surge tank 13, and the intake manifold 14 constitute an intake system of the engine 1.

The engine 1 also includes, for each cylinder, a fuel injector, referred to simply as an injector, 16. The injector 16 is so disposed in the intake manifold 14 as to be directed to the combustion chamber 5 of a corresponding cylinder. To each injector 16, a fuel supply pipe 17 is communicably coupled, and the fuel supply pipe 17 is communicably coupled to a fuel tank (not shown). Each injector 16 is electrically connected to the ECM 60. Under control by the ECM 60, each injector 16 is operative to spray a controlled quantity of fuel into the intake port of a corresponding cylinder at a controlled timing.

The combustion chamber 5 of each cylinder also communicates via an exhaust port with an exhaust manifold, i.e. the assembly of exhaust tubes, 21. An exhaust valve member 2b is disposed in the cylinder head 2 for each cylinder for opening or closing the exhaust port of the corresponding cylinder.

To the exhaust manifold 21, an exhaust passage 22 is communicably coupled. A catalytic converter 23 is disposed in the exhaust passage 22. The catalytic converter 23 has a catalyst 24 and is operative to clean exhaust gas out of the engine 1 via the exhaust passage 22. The exhaust manifold 21, the exhaust passage 22, and the exhaust converter 23 constitute an exhaust system of the engine 1.

The engine 1 further includes a VVT (Variable Valve Timing) mechanism. The VVT mechanism includes an intake VVT actuator 31, an exhaust VVT actuator 32, a first oil control valve 33, and a second oil control valve 34.

The intake VVT actuator 31 is mechanically coupled to one end of an intake camshaft (not shown) coupled to the crankshaft. The exhaust VVT actuator 32 is mechanically coupled to one end of an exhaust camshaft (not shown) coupled to the crankshaft.

For example, the intake camshaft is provided with cam-drive members for the respective intake valve members 2a, and each of the cam-drive members is designed to drive a corresponding one of the intake valve members 2a to open or close a corresponding intake port based on rotation of the intake camshaft. Similarly, for example, the exhaust camshaft is provided with cam-drive members for the respective exhaust valve members 2b, and each of the cam-drive members is designed to drive a corresponding one of the exhaust valve members 2b to open or close a corresponding one of the exhaust ports based on rotation of the exhaust camshaft.

Each of the intake and exhaust VVT actuators 31 and 32 is designed to hydraulically control the rotational phase of a corresponding one of the intake and exhaust camshafts based on the rotational phase of the crankshaft. The control of the rotational phase of the intake camshaft changes the opening and closing timings of the intake valves. Similarly, the control of the rotational phase of the exhaust camshaft changes the opening and closing timings of the exhaust valves.

Specifically, each of the intake and exhaust VVT actuators 31 and 32 is communicably coupled to a hydraulic fluid supply (not shown) via a corresponding one of the first and second oil control valves 33 and 34. Each of the first and second oil control valves 33 and 34 is electrically connected to the ECM 60. Each of the first and second oil control valves 33 and 34 is designed to control the pressure of hydraulic fluid supplied from the hydraulic fluid supply under control by the ECM 60, and feed the pressure-controlled hydraulic fluid to a corresponding one of the intake and exhaust VVT actuators 31 and 32.

Each of the intake and exhaust VVT actuators 31 and 32 is designed to control, based on the pressure of the hydraulic fluid fed from a corresponding one of the first and second oil control valves 33 and 34, the rotational phase of a corresponding one of the intake and exhaust camshafts relative to the rotational phase of the crankshaft.

The engine 1 further includes an ignition coil 6 electrically connected to spark plugs (not shown) for the respective cylinders and to the ECM 60. Each of the spark plugs is disposed in the cylinder head 2 to direct communication with the combustion chamber 5 of a corresponding one of the cylinders. The ignition coil 6 is operative to boost a controlled voltage supplied from the ECM 60, and apply the boosted voltage to each of the spark plugs. Each of the spark plugs is operative to generate a spark in the combustion chamber 5 of a corresponding one of the cylinders based on the applied voltage to start combustion of air-fuel mixture therein.

The engine 1 includes a PCV (Positive Crankcase Ventilation) valve 41, a first blowby gas pipe 42, and a second blowby gas pipe 43. The PCV valve 41 is communicably coupled to the crankcase of the engine 1, and the first blowby gas pipe 42 is communicably coupled between the PCV valve 41 and the surge tank 13. The first blowby gas pipe 42 is operative to reroute blowby gas in the crankcase to the surge tank 13 via the PCV valve 41 and the first blowby gas pipe 42, thus causing the blowby to be re-burned in the compression chambers 5 of the cylinders. The second blowby pipe 42 is operative to reroute blowby gas escaped out of the crankcase to the intake pipe 41, thus causing the blowby to be re-burned in the compression chambers 5 of the cylinders.

Figure 2:
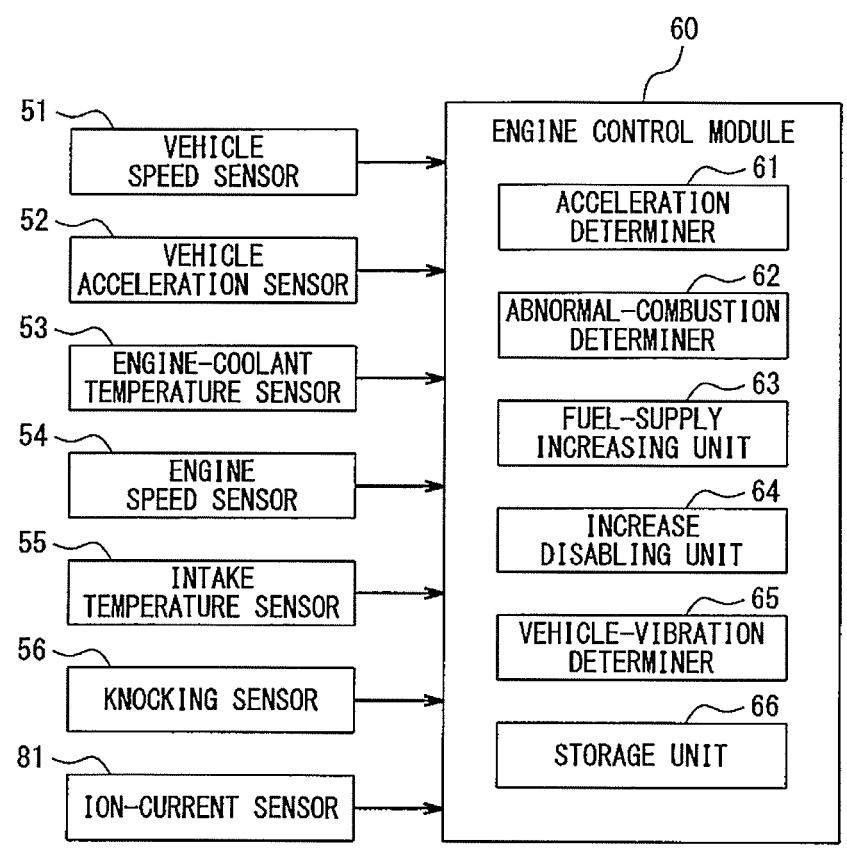
FIG. 2 is a block diagram schematically illustrating a structural example of an engine control module illustrated in FIG. 1.

Referring to FIG. 2, the vehicle according to this embodiment incorporates therein a vehicle speed sensor 51, a vehicle acceleration sensor, i.e. a vehicle G sensor 52, an engine-coolant temperature sensor 53, an engine speed sensor 54, an intake temperature sensor 55, knocking sensors 56, and an airflow sensor 57. These sensors 51 to 57 are electrically connected to the ECM 60.

The vehicle speed sensor 51 is operative to measure the speed of the vehicle, and output a signal indicative of the measured speed of the vehicle to the ECM 60.

The vehicle acceleration sensor 52 is mounted on, for example, the floor surface of the cabin of the vehicle, and is operative to measure acceleration including G and being applied thereto, and to output, to the ECM 60, a signal indicative of the measured acceleration. For example, the ECM 60 is capable of obtaining, based on the signal indicative of the measured acceleration, vibrations of the vehicle and the road gradient, i.e. the tilt of the vehicle.

The engine-coolant temperature sensor 53 is operative to measure the temperature of an engine coolant inside the engine 1, and to output a signal indicative of the measured temperature of the engine coolant to the ECM 60.

The engine speed sensor 54 is attached to the engine 1, and operative to measure the speed of the engine 1, and output a signal indicative of the measured speed of the engine 1 to the ECM 60.

The intake temperature sensor 55 is attached to the intake pipe 11, and operative to measure the temperature of intake air in the intake pipe 11, and output a signal indicative of the measured temperature of intake air to the ECM 60.

The airflow sensor 57 is attached to the intake pipe 11, and operative to measure the airflow in the intake pipe 11, i.e. the rate at which air enters the engine 1 through the intake pipe 11, and output a signal indicative of the measured airflow to the ECM 60. For example, in this embodiment, the airflow sensor 57 is located in the intake pipe 11 at the downstream of the air cleaner 15, and the intake temperature sensor 55 is located in the intake pipe 11 at the downstream of the airflow sensor 57.

The knocking sensors 56 are mounted in the cylinder block of the engine 1 for the respective cylinders. Each of the knocking sensors 56, serving as an abnormal-combustion level detector, is operative to measure high-frequency vibrations caused by knocking in a corresponding one of the cylinders, and output an electrical signal indicative of the vibrations to the ECM 60.

For example, the EMC 60 is designed as an ECU (Electronic Control Unit) including a microcomputer and its peripherals. Specifically, the EMC 60 is comprised of a CPU, a ROM, a RAM, and so on. In the ROM, one or more programs are stored; the one or more programs cause the CPU to perform various tasks using the RAM.

The ECM 60 is operative to perform the various tasks for controlling the engine 1 as a function of the signals outputted from the sensors 51 to 57. Particularly, the ECU 60 is operative to perform a task for suppressing abnormal combustion, i.e. detonation, in the engine 1 as a function of the signals outputted from the sensors 51 to 57.

FIG. 2 is a block diagram schematically illustrating a structural example of the ECM 60 for performing the tasks set forth above.

Referring to FIG. 2, the ECM 60 includes an acceleration determiner 61, an abnormal-combustion determiner 62, a fuel-supply increasing unit 63, an increase disabling unit 64, and a vehicle-vibration determiner 65. The ECM 60 also includes a storage unit 66.

The acceleration determiner 61 is operative to determine whether the vehicle is accelerating. Specifically, the acceleration determiner 61 is operative to determine, based on the measured signal sent from the vehicle speed sensor 51, whether the rate of change in the vehicle speed, i.e. the acceleration of the vehicle while the vehicle is running, is equal to or greater than a predetermined first threshold. Upon determination that the rate of change in the vehicle speed measured by the vehicle sensor 51 is equal to or greater than the first threshold, the acceleration determiner 61 determines that the vehicle is accelerating. The first threshold for the rate of change in the vehicle speed is previously determined experimentally, empirically, and/or theoretically to allow whether the vehicle is accelerating to be determined.

The abnormal-combustion determiner 62 is operative to determine whether abnormal combustion takes place in each cylinder of the engine 1. Specifically, the abnormal-combustion determiner 62 is operative to determine, based on the measured signals sent from the knocking sensors 56 provided for the respective cylinders, whether abnormal combustion takes place in each of the cylinders. Upon determination that the level of the measured signal sent from at least one knocking sensor 56 is equal to or greater than a predetermined second threshold, the abnormal-combustion determiner 62 determines that abnormal combustions take place in at least one cylinder to which the corresponding at least one knocking sensor 56 is attached. The second threshold for the measured signals sent from the knocking sensors 56 is previously determined experimentally, empirically, and/or theoretically to allow whether abnormal combustions take place in each of the cylinders to be determined.

The abnormal-combustion determiner 62 can be operative to determine whether abnormal combustion due to pre-ignition or other similar detonations takes place in each cylinder of the engine 1.

The fuel-supply increasing unit 63 is operative to increase a predetermined quantity of fuel to be sprayed from at least one injector 16 into the intake port of a corresponding cylinder. Specifically, the fuel-supply increasing unit 63 is operative to control at least one injector 16 to extend a predetermined period during which fuel is being sprayed from the at least one injector 16 into the intake port of a corresponding cylinder, thus increasing a quantity of fuel sprayed from the at least one injector 16 into the intake port of a corresponding cylinder.

The increase disabling unit 64 is operative to disable the fuel-supply increasing unit 63 from increasing a supply of fuel from at least one injector 16.

The vehicle-vibration determiner 65 is operative to determine whether the vehicle is vibrating, that is, a level of vibrations of the vehicle has reached a predetermined level. Specifically, the vehicle-vibration determiner 65 is operative to:

determine whether the level of the measured signal sent from the vehicle acceleration sensor 52 representing the acceleration applied thereto is equal to or greater than a predetermined third threshold, or determine, based on the measured signal sent from the vehicle speed sensor 51, whether the rate of change in the engine speed is equal to or greater than a predetermined fourth threshold.

Upon determination that the level of the measured signal sent from the vehicle acceleration sensor 52 representing the acceleration applied thereto is equal to or greater than the third threshold, the vehicle-vibration determiner 65 determines that the vehicle is vibrating. In addition, upon determination that rate of change in the engine speed is equal to or greater than the fourth threshold, the vehicle-vibration determiner 65 determines that the vehicle is vibrating. Each of the third and fourth thresholds for a corresponding one of the acceleration applied to the vehicle acceleration sensor 52 and the rate of change in the engine speed is previously determined experimentally, empirically, and/or theoretically to allow whether the vehicle is vibrating to be determined.

As the storage unit 66, a rewritable memory, such as the RAM, is used.

If it is determined by the abnormal-combustion determiner 62 that abnormal combustion takes place in at least one cylinder, the abnormal-combustion determiner 62 is operative to store, in the storage unit 66, information uniquely identifying the at least one cylinder as an abnormal-combustion cylinder. For example, if unique numbers are allocated to the respective cylinders, the abnormal-combustion determiner 62 is operative to store, in the storage unit 66, a unique number corresponding to the abnormal-combustion cylinder.

Figure 3:
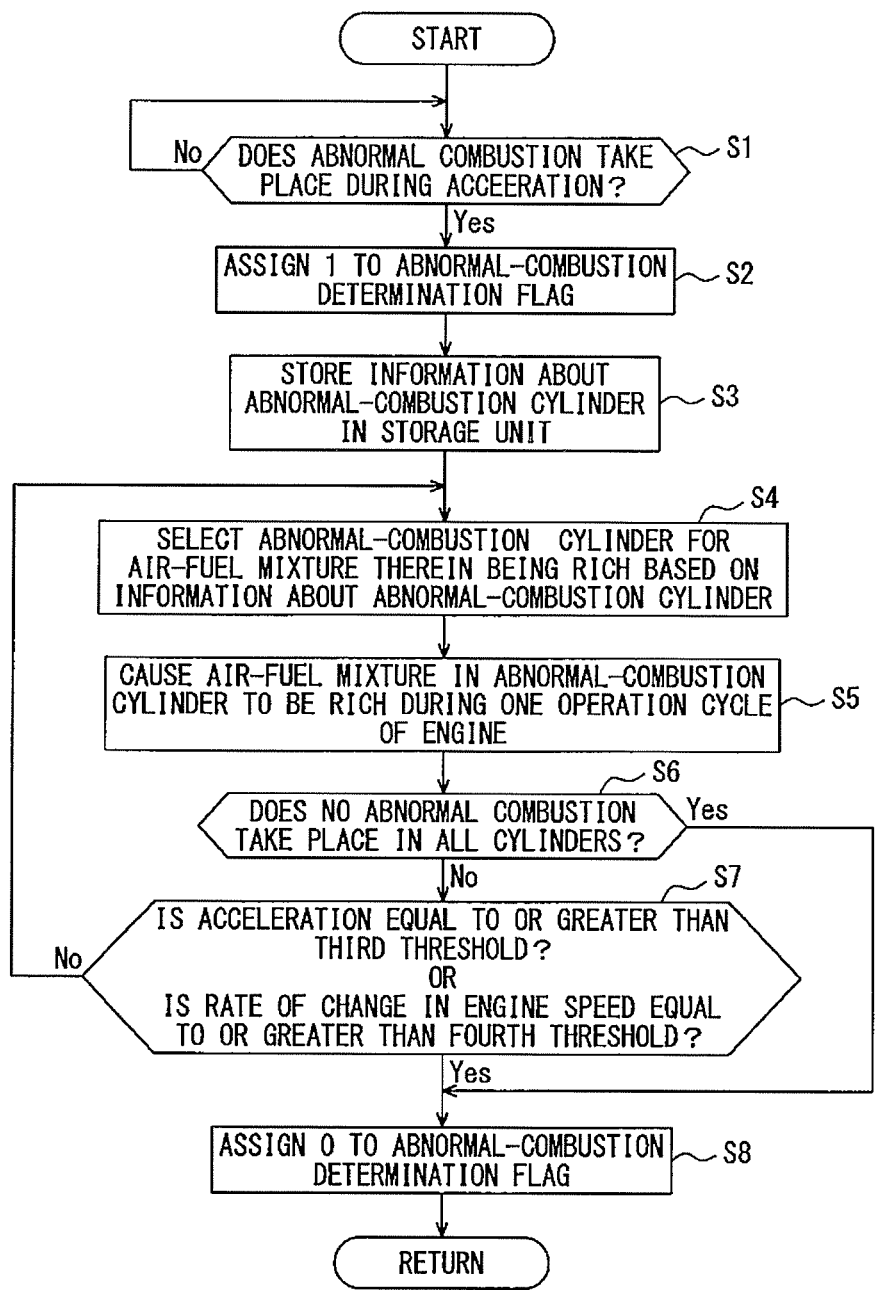
FIG. 3 is a flowchart schematically illustrating an abnormal-combustion suppressing routine carried out by the engine control module illustrated in FIG. 2.

FIG. 3 schematically illustrates an abnormal-combustion suppressing routine carried out by the ECM 60 configured set forth above. Note that the ECM 60 is programmed to, for example, execute the abnormal-combustion suppressing routine illustrated in FIG. 3 in parallel with other tasks for controlling the engine 1.

Referring to FIG. 3, the ECM 60 serves as the acceleration determiner 61 to determine whether the vehicle is accelerating based on the measured signal sent from the vehicle speed sensor 51, and serves as the abnormal-combustion determiner 62 to determine whether abnormal combustion takes place in each cylinder based on the measured signals sent from the knocking sensors 56 in step S1.

In step S1, upon determination that abnormal combustion takes place in at least one cylinder, referred to as an abnormal-combustion cylinder, while the vehicle is accelerating (YES in step S1), the abnormal-combustion suppressing routine proceeds to step S2.

In step S2, the ECM 60 assigns 1 to an abnormal-combustion determination flag that represents whether or not abnormal combustion takes place. That is, the abnormal-combustion determination flag of 1 means that abnormal combustion takes place in the engine 1 while the vehicle is accelerating. Then, the ECM 60 starts to perform an abnormal-combustion suppressing task.

Specifically, in step S3, the ECM 60 stores information uniquely representing the abnormal-combustion cylinder, such as the unique number of the abnormal-combustion cylinder, in the storage unit 66. In step S3, if it is determined that abnormal combustion takes place in several cylinders, referred to as abnormal-combustion cylinders, while the vehicle is accelerating in step S1, the ECM 60 stores information uniquely representing each of the abnormal-combustion cylinders, such as the unique number of each of the abnormal-combustion cylinders, in the storage unit 66.

Next, the ECM 60 serves as the fuel-supply increasing unit 63 to select, based on the unique information, i.e. the unique number, about at least one abnormal-combustion cylinder stored in the storage unit 66, an abnormal-combustion cylinder with the air-fuel mixture therein being scheduled to be rich in step S4. In other words, the ECM 60 is scheduled to increase a quantity of fuel to be sprayed into the selected abnormal-combustion cylinder from the corresponding injector 16 in comparison to a normal quantity of fuel. If the unique information about a single abnormal-combustion cylinder is stored in the storage unit 66, the ECM 60 selects the single abnormal-combustion cylinder.

On the other hand, if pieces of unique information, such as unique numbers, about several abnormal-combustion cylinders are stored in the storage unit 66, the ECM 60 selects one of the abnormal-combustion cylinders in step S4. For example, the fuel-supply increasing unit 63 sequentially selects the several abnormal-combustion cylinders, i.e. their unique numbers stored in the storage unit 66, in a previously scheduled firing order of the several abnormal-combustion cylinders. Specifically, the fuel-supply increasing unit 63 selects one abnormal-combustion cylinder in the several abnormal-combustion cylinders first; a power stroke of the selected abnormal-combustion cylinder is scheduled to be earlier than those of the remaining abnormal-combustion cylinders after the detection of the abnormal-combustion cylinders.

In step S4, how to select the several abnormal-combustion cylinders is not limited to the aforementioned approaches. For example, the fuel-supply increasing unit 63 sequentially selects the several abnormal-combustion cylinders based on the levels of abnormal combustion in the respective abnormal-combustion cylinders. In this approach, the higher the level of the measured signal sent from a knocking sensor 56 corresponding to an abnormal-combustion cylinder is, the higher the level of abnormal combustion in the corresponding abnormal-combustion cylinder is. That is, the fuel-supply increasing unit 63 selects the several abnormal-combustion cylinders in the descending order of the levels of the measured signals sent from the knocking sensors 56 corresponding to the respective abnormal-combustion cylinders.

Next, the ECM 60 serves as the fuel-supply increasing unit 63 to cause the air-fuel mixture in the abnormal-combustion cylinder selected in step S4 to be rich in step S5. Specifically, in step S5, the fuel-supply increasing unit 63 increases a supply of fuel into the selected abnormal-combustion cylinder from the corresponding injector 16 in comparison to a normal quantity of fuel required for the same cylinder in which no abnormal combustion takes place.

In addition, in step S5, the fuel-supply increasing unit 63 increases a quantity of fuel to be sprayed into an abnormal-combustion cylinder from a corresponding injector 16 during each operating cycle of the engine 1. Specifically, the fuel-supply increasing unit 63 increases a supply of fuel into one abnormal-combustion cylinder from a corresponding injector 16 during one operating cycle of the engine 1 while preventing an increase in a quantity of fuel to be sprayed into the other abnormal-combustion cylinders from the corresponding injectors 16.

In other words, in step S5, the fuel-supply increasing unit 63 performs an increase in a quantity of fuel to be sprayed exclusively into a selected abnormal-combustion cylinder. In this embodiment, one operating cycle of the engine 1 corresponds to four-stroke cycle thereof, in other words, two rotations of the crankshaft of the engine 1.

Next, the ECM 60 serves as the abnormal-combustion determiner 62 to determine whether no abnormal combustion takes place in all the cylinders based on the measured signals sent from all the knocking sensors 56 in step S6. When it is determined that no abnormal combustion takes place in all the cylinders (YES in step S6), the abnormal-combustion suppressing routine proceeds to step S8. Otherwise, when it is determined that abnormal combustion takes place in at least one cylinder (NO in step S6), the abnormal-combustion suppressing routine proceeds to step S7.

In step S7, the ECM 60 serves as the vehicle-vibration determiner 65 to:

determine whether the level of the measured signal sent from the vehicle acceleration sensor 52 representing the acceleration applied thereto is equal to or greater than the third threshold, or determine, based on the measured signal sent from the engine speed sensor 54, whether the rate of change in the engine speed is equal to or greater than the fourth threshold.

Upon determination that the level of the measured signal sent from the vehicle acceleration sensor 52 is smaller than the third threshold, or the rate of change in the engine speed is smaller than the fourth threshold (YES in step S7), the abnormal-combustion suppressing routine returns to step S4, so that the ECM 60 repeats the operations in steps S4 to S7.

Otherwise, upon determination that the level of the measured signal sent from the vehicle acceleration sensor 52 is equal to or greater than the third threshold, or the rate of change in the engine speed is equal to or greater than the fourth threshold (YES in step S7), the abnormal-combustion suppressing routine proceeds to step S8.

In step S8, the ECM 60 serves as the increase disabling unit 64 to disable the fuel-supply increasing unit 63 from causing the air-fuel mixture in at least one abnormal-combustion cylinder to be rich, in other words, from increasing a quantity of fuel to be sprayed from at least one injector 16 corresponding to at least one abnormal-combustion cylinder. Then, in step S8, the ECM 60 assigns 0 to the abnormal-combustion determination flag, and thereafter, terminates the abnormal-combustion suppressing routine.

Next, operations of the ECM 60 will be described hereinafter.

When determining that abnormal combustion takes place in at least one cylinder, referred to as at least one abnormal-combustion cylinder, while the vehicle is accelerating, the ECM 60 assigns 1 to the abnormal-combustion determination flag to start to perform the abnormal-combustion suppressing task, and stores information uniquely representing the at least one abnormal-combustion cylinder, such as the unique number of the at least one abnormal-combustion cylinder, in the storage unit 66 (see steps S1 to S3).

The ECM 60 reads the unique information, i.e. the unique number, about at least one abnormal-combustion cylinder, from the storage unit 66, and causes the air-fuel mixture in the at least one abnormal-combustion cylinder to be rich (see steps S4 and S5).

If there are several abnormal-combustion cylinders, the ECM 60 sequentially selects the several abnormal-combustion cylinders, i.e. their unique numbers, in the descending order of the levels of abnormal combustion in the several abnormal-combustion cylinders or the firing order of the several abnormal-combustion cylinders. Then, the ECM 60 sequentially causes the air-fuel mixtures of the selected abnormal-combustion cylinders to be rich.

The ECM 60 continues to cause the air-fuel mixtures of the abnormal-combustion chambers to be rich until no abnormal combustion takes place in all the cylinders, or unless the level of the vehicle vibrations reaches a predetermined level (see steps S6 and S7).

On the other hand, if it is determined that no abnormal combustion takes place in all the cylinders, or the level of the vehicle vibrations has reached the predetermined level, the ECM 60 shut downs the abnormal-combustion suppressing task to disable the air-fuel mixture in at least one abnormal-combustion cylinder from being rich (see steps S6 to S8). This returns the quantity of fuel to be sprayed from at least one injector 16 corresponding to at least one abnormal-combustion cylinder into a normal quantity of fuel required for the same cylinder in which no abnormal combustion takes place. Thereafter, the ECM 60 assigns 0 to the abnormal-combustion determination flag (see step S8).

As described above, the system for controlling combustion conditions in the engine 1 according to this embodiment is configured to cause the air-fuel mixture in at least one abnormal-combustion cylinder to be rich. This configuration increases latent heat of vaporization of fuel in the at least one abnormal-combustion cylinder to thereby cool the at least one abnormal-combustion cylinder, resulting in reduction of the duration of abnormal combustion in the at least one abnormal-combustion cylinder.

The system for controlling combustion conditions in the engine 1 according to this embodiment is configured to halt the operation to cause the air-fuel mixture in at least one abnormal-combustion cylinder to be rich upon determination that the level of the vehicle vibrations has reached a predetermined level. More specifically, the system is configured to halt the operation to cause the air-fuel mixture in at least one abnormal-combustion cylinder to be rich upon determination that the level of the measured signal sent from the vehicle acceleration sensor 52 is smaller than the third threshold, or the rate of change in the engine speed is smaller than the fourth threshold. This configuration prevents an increase in the level of the vibrations of the engine 1 due to an increase in the supply of fuel into at least one abnormal-combustion cylinder in comparison to the level of the vibrations of the engine 1 in which no abnormal combustion takes place. This prevents the vehicle vibrations from giving discomfort to occupants of the vehicle.

The system for controlling combustion conditions in the engine 1 according to this embodiment is configured to increase a quantity of fuel to be sprayed into one abnormal-combustion cylinder from a corresponding injector 16 during one operating cycle of the engine 1 while preventing an increase in a quantity of fuel to be sprayed into the other abnormal-combustion cylinders from the corresponding injectors 16.

In other words, the system is configured to perform an increase in a quantity of fuel to be sprayed exclusively into a selected abnormal-combustion cylinder.

This configuration aims to minimize the possibility of reduction in the catalytic conversion efficiency for unburned gas components including HC (Hydrocarbon) and CO (Mono Carbon Oxide) in the exhaust gas due to the air-fuel ratio in the exhaust gas richer than the ideal air-fuel ratio, i.e. the stoichiometric ratio corresponding to a 14.7:1 air-fuel ratio.

For example, the technology disclosed in the U.S. Pat. No. 3,382,771 set forth above continues to increase a quantity of fuel to be supplied into an engine for a preset period, such as five seconds or thereabout in order to avoid the occurrence of pre-ignition in the engine. Thus, an increase in the supply of fuel into the engine during the preset period causes the air-fuel ratio in the exhaust gas out of the engine to be richer than the ideal air-fuel ratio.

Three-way catalysts are normally used as catalysts for cleaning exhaust gas out of engines. Such three-way catalysts have characteristics that, the more the air-fuel ratio in the exhaust gas approaches the ideal air-fuel ratio, the more properly catalytic conversion of the exhaust gas is. Due to the characteristics, such a three-way catalyst, installed in a vehicle to clean the exhaust gas out of the engine, may not effectively clean the exhaust gas out of the engine if the air-fuel ratio in the exhaust gas is richer than the ideal air-fuel ratio For this reason, merely increasing a quantity of fuel to be sprayed into the engine as disclosed in the U.S. Pat. No. 3,382,771 may result in the possibility of insufficient clean-up of the exhaust gas.

In view of these circumstances, the system for controlling combustion conditions in the engine 1 according to this embodiment is configured to increase a quantity of fuel to be sprayed into one abnormal-combustion cylinder from a corresponding injector 16 during one operating cycle of the engine 1 while preventing an increase in a quantity of fuel to be sprayed into the other abnormal-combustion cylinders from the corresponding injectors 16. This configuration prevents the air-fuel ratio in a portion of the exhaust gas located immediately before the catalyst 24, i.e. the exhaust passage 22, from being richer than the ideal air-fuel ratio, thus maintaining at a high level the conversion efficiency of the catalyst 24 for the exhaust gas.

In view of reduction in the engine vibrations, the system for controlling combustion conditions in the engine 1 according to this embodiment could simultaneously increase quantities of fuel to be sprayed into all the abnormal-combustion cylinders from the respective injectors 16, thus matching the levels of power created in the respective cylinders with each other at the same time. This configuration could reduce the engine vibrations in comparison to the case where the system increases quantities of fuel to be sprayed into individually selected abnormal-combustion cylinders at respectively different timings. However, this configuration could result in the risk of a reduction in the conversion efficiency of the catalyst 24 for the exhaust gas. In view of this point, the system according to this embodiment is configured to perform an increase in a quantity of fuel to be delivered exclusively into a selected abnormal-combustion cylinder while weighing the level of clean-up of the exhaust gas against the level of the engine vibrations.

In addition, in the first embodiment, the ECM 60 is configured to determine whether to perform the fuel-supply increasing operation (see steps S2 to S5) using the condition of whether the acceleration of the vehicle while the vehicle is running is equal to or greater than the predetermined first threshold in step S1.

Specifically, upon determination that the acceleration of the vehicle while the vehicle is running is smaller than the predetermined first threshold (NO in step S1), the ECM 60 is configured to avoid the fuel-supply increasing operation (see steps S2 to S5) even if abnormal combustion takes place in at least one cylinder 16.

Because the acceleration of the vehicle while the vehicle is running is smaller than the predetermined first threshold, it is determined that the vehicle is under the running condition of the vehicle in which the occupants are sensitive to the variations in a level of the vibrations of the engine 1. Thus, when the vehicle is under the running condition, avoiding the fuel-supply increasing operation prevents the vibrations of the engine 1 due to execution of the fuel-supply increasing operation from giving discomfort to occupants of the vehicle.

Second Embodiment

A system for controlling combustion conditions in the engine 1 according to a second embodiment of the present invention will be described hereinafter. In the second embodiment, components identical to those of the first embodiment, to which like reference characters are assigned, are omitted or simplified to avoid redundant description.

The structure and/or functions of the system for controlling combustion conditions in the engine 1 according to the second embodiment are mainly identical to those of the system for controlling combustion conditions in the engine 1 according to the first embodiment except for the following points. So, the different points will be mainly described hereinafter.

The system for controlling combustion conditions in the engine 1 according to the second embodiment is configured to increase a quantity of fuel to be sprayed into one selected abnormal-combustion cylinder from a corresponding injector 16 while reducing a fuel to be sprayed to at least one remaining cylinder other than the selected abnormal-combustion cylinder from a corresponding at least one injector 16.

Figure 4:
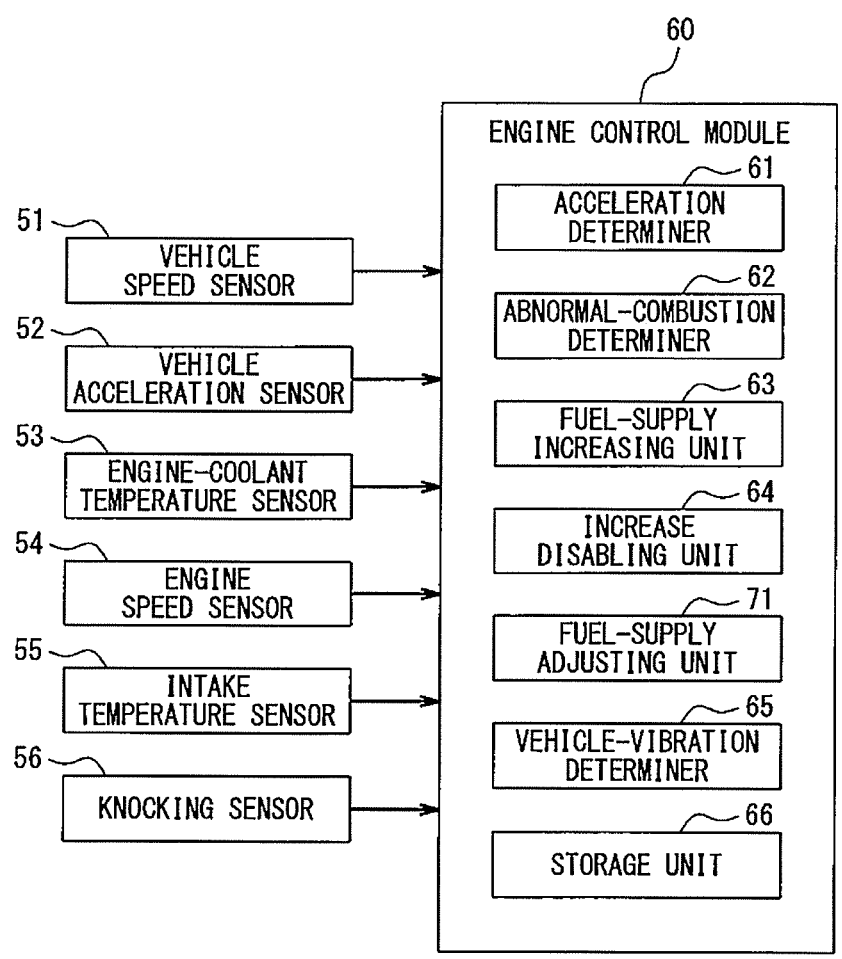
FIG. 4 is a block diagram schematically illustrating a structural example of an engine control module according to a second embodiment of the present invention.

FIG. 4 is a block diagram schematically illustrating a structural example of an ECM 60 for performing tasks according to the second embodiment.

Referring to FIG. 4, the ECM 60 includes a fuel-supply adjusting unit 71, serving as a fuel supply reducing unit, in addition to the components 61 to 66.

FIG. 5 schematically illustrates an abnormal-combustion suppressing routine carried out by the ECM 60 according to the second embodiment. Note that the ECM 60 is programmed to, for example, execute the abnormal-combustion suppressing routine illustrated in FIG. 5 in parallel with other tasks for controlling the engine 1.

As illustrated in FIG. 5, the abnormal-combustion suppressing routine according to the second embodiment includes an operation in step S21 after the operation in step S5 in comparison to the abnormal-combustion suppressing routine according to the first embodiment illustrated in FIG. 3. Thus, in the abnormal-combustion suppressing routine according to the second embodiment, like steps to the abnormal-combustion suppressing routine according to the first embodiment, to which like step numbers are assigned, are omitted or simplified to avoid redundant description.

In step S21, the ECM 60 serves as the fuel-supply adjusting unit 71 to reduce a quantity of fuel to be delivered into at least one remaining cylinder other than the selected abnormal-combustion cylinder in which the air-fuel mixture is being controlled to be rich in step S5. The at least one remaining cylinder other than the selected abnormal-combustion cylinder in which the air-fuel mixture is being controlled to be rich in step S5 include, for example, at least one other abnormal-combustion cylinder and/or at least one normal cylinder in which no abnormal combustion takes place.

For example, the fuel-supply adjusting unit 71 is operative to control at least one injector 16 corresponding to at least one remaining cylinder to reduce a predetermined period during which fuel is being sprayed from the at least one injector 16 into the intake port of the at least one remaining cylinder. This reduces a supply of fuel into the intake port of the at least one remaining cylinder from the corresponding at least one injector 16.

In addition, the fuel-supply adjusting unit 71 is operative to reduce a quantity of fuel to be sprayed into at least one remaining cylinder such that the air-fuel ratio in a portion of the exhaust gas located immediately before the catalyst 24, i.e. the exhaust passage 22, becomes the stoichiometric ratio corresponding to a 14.7:1 air-fuel ratio. For example, the fuel-supply adjusting unit 71 is operative to reduce a quantity of fuel to be supplied into at least one remaining cylinder such that the reduced quantity of fuel supply matches with an increase in a quantity of fuel to be injected into the selected abnormal-combustion cylinder in which the air-fuel mixture is being controlled to be rich in step S5.

If there are several remaining injectors other than the selected abnormal-combustion cylinder in which the air-fuel mixture is being controlled to be rich in step S5, the fuel-supply adjusting unit 71 is operative to reduce a quantity of fuel to be sprayed into each of the remaining injectors equally, such that the reduced quantity of fuel equally for each of the remaining cylinders matches with an increase in a quantity of fuel to be supplied into the selected abnormal-combustion cylinder in which the air-fuel mixture is being controlled to be rich in step S5. Because the amount of air entering each cylinder is normally the same, the fuel-supply adjusting unit 71 is operative to reduce the same quantity of fuel to be sprayed into each of the remaining injectors.

Other structures and functions of the system according to this embodiment will be substantially identical to those of the system according to the first embodiment.

The system for controlling combustion conditions in the engine 1 according to this embodiment is configured to reduce a quantity of fuel to be sprayed into at least one remaining cylinder other than the selected abnormal-combustion cylinder in which the air-fuel mixture is being controlled to be rich such that the air-fuel ratio in a portion of the exhaust gas located immediately before the catalyst 24 becomes the ideal air-fuel ratio. This configuration allows the catalyst 24 located in the exhaust passage 22 of the engine 1 to effectively clean unburned components including HC and CO in the exhaust gas out of the engine 1.

Causing the air-fuel mixture in the selected abnormal-combustion cylinder to be rich results in that the air-fuel mixture in the total exhaust gas from at least one remaining cylinder, which is other than the selected abnormal-combustion cylinder in which the air-fuel mixture is being controlled to be rich, becomes rich. That is, the ratio of air to fuel in the total exhaust gas is smaller than the ratio of air to fuel in the ideal air-fuel ratio. This may reduce the conversion efficiency of the catalyst 24 for the exhaust gas.

In view of this point, the system for controlling combustion conditions in the engine 1 according to the second embodiment is configured to reduce a quantity of fuel to be sprayed into at least one remaining cylinder other than the selected abnormal-combustion cylinder in which the air-fuel mixture is being controlled to be rich. This allows the catalyst 24 disposed in the exhaust passage 22 of the engine 1 to effectively clean unburned components, such as HC and CO, in the exhaust gas.

If there are several remaining injectors other than the selected abnormal-combustion cylinder in which the air-fuel mixture is being controlled to be rich, the system according to the second embodiment is configured to reduce the same quantity of fuel to be sprayed into each of the remaining injectors such that the reduced quantity of fuel for each of the remaining cylinders matches with an increase in a quantity of fuel to be supplied into the selected abnormal-combustion cylinder in which the air-fuel mixture is being controlled to be rich. This configuration prevents reduction in quantity of fuel from the remaining cylinders from being unbalanced therebetween, thus preventing an increase in an amount of NOx due to the unbalance in reduction of fuel quantity between the remaining cylinders. The configuration also prevents variations in the levels of power created in the respective remaining cylinders, thus preventing an increase in the fluctuations of the engine speed. This makes it possible to prevent the engine vibrations due to an increase in the fluctuations of the engine sped from giving discomfort to occupants of the vehicle.

Third Embodiment

A system for controlling combustion conditions in the engine 1 according to a third embodiment of the present invention will be described hereinafter. In the third embodiment, components identical to those of the first or second embodiment, to which like reference characters are assigned, are omitted or simplified to avoid redundant description.

The structure and/or functions of the system for controlling combustion conditions in the engine 1 according to the third embodiment are mainly identical to those of the system for controlling combustion conditions in the engine 1 according to the second embodiment except for the following points. So, the different points will be mainly described hereinafter.

The system for controlling combustion conditions in the engine 1 according to the third embodiment is configured to determine how to cause the air-fuel mixture in at least one abnormal-combustion cylinder to be rich based on the level of abnormal combustion in the at least one abnormal-combustion cylinder.

FIG. 6 schematically illustrates an abnormal-combustion suppressing routine carried out by the ECM 60 according to the third embodiment. Note that the ECM 60 is programmed to, for example, execute the abnormal-combustion suppressing routine illustrated in FIG. 6 in parallel with other tasks for controlling the engine 1.

As illustrated in FIG. 6, the abnormal-combustion suppressing routine according to the third embodiment includes operations in steps S41 to S44 after the operation in step S3 in comparison to the abnormal-combustion suppressing routine according to the second embodiment illustrated in FIG. 5. Thus, in the third embodiment, like steps to the abnormal-combustion suppressing routine according to each of the first and second embodiments, to which like step numbers are assigned, are omitted or simplified to avoid redundant description.

Referring to FIG. 6, after the operation in step S3, the ECM 60 determines whether there is at least one abnormal-combustion cylinder with its level of abnormal combustion being equal to or greater than a predetermined fifth threshold in step S41. The fifth threshold for the level of abnormal combustion is previously determined experimentally, empirically, and/or theoretically to allow whether abnormal combustion takes place in each cylinder to be determined.

Upon determination that there is at least one abnormal-combustion cylinder with its level of abnormal combustion being equal to or greater than the fifth threshold (YES in step S41), the abnormal-combustion suppressing routine proceeds to step S42. Otherwise, upon determination that there are no abnormal-combustion cylinders with their levels of abnormal combustion being smaller than the fifth threshold (NO in step S41), the abnormal-combustion suppressing routine proceeds to step S43.

In step S42, the ECM 60 serves as the fuel-supply increasing unit 63 to select, based on the unique information, i.e. the unique number, about at least one abnormal-combustion cylinder stored in the storage unit 66, an abnormal-combustion cylinder with the air-fuel mixture therein being scheduled to be rich. Then, in step S42, the ECM 60 serves as the fuel-supply increasing unit 63 to determine how to cause the air-fuel mixture in the selected abnormal-combustion cylinder to be rich, and thereafter, the abnormal-combustion suppressing routine proceeds to step S44 in place of step S5 set forth above.

If the unique information about a single abnormal-combustion cylinder is stored in the storage unit 66, the fuel-supply increasing unit 63 selects the single abnormal-combustion cylinder in step S42.

On the other hand, if pieces of unique information, such as unique numbers, about several abnormal-combustion cylinders are stored in the storage unit 66, the fuel-supply increasing unit 63 selects the several abnormal-combustion cylinders, i.e. their unique numbers, in the descending order of the levels of abnormal combustion therein.

In step S42, the fuel-supply increasing unit 63 determines the number of times to cause the air-fuel mixture in the selected abnormal-combustion cylinder to be rich as information about how to cause the air-fuel mixture in the selected abnormal-combustion cylinder to be rich. In other words, the fuel-supply increasing unit 63 determines the number of times to perform a mixture-rich task for the selected abnormal-combustion cylinder set forth above as information about how to cause the air-fuel mixture in the selected abnormal-combustion cylinder to be rich.

In addition, in step S42, the fuel-supply increasing unit 63 determines whether to continuously or discontinuously perform the mixture-rich task for the selected abnormal-combustion cylinder.

In step S42, the fuel-supply increasing unit 63 determines the number of times to perform the mixture-rich task for the selected abnormal-combustion cylinder as a function of the level of abnormal combustion in the selected abnormal-combustion cylinder.

Specifically, the fuel-supply increasing unit 63 increases the number of times to perform the mixture-rich task for the selected abnormal-combustion cylinder with an increase in the level of abnormal combustion in the selected abnormal-combustion cylinder.

The fuel-supply increasing unit 63 can determine the number of times to perform the mixture-rich task for the selected abnormal-combustion cylinder as a function of the temperature of the engine coolant measured by the engine-coolant temperature sensor 53 and/or the temperature of intake air measured by the intake temperature sensor 55. Specifically, the fuel-supply increasing unit 63 can increase the number of times to perform the mixture-rich task for the selected abnormal-combustion cylinder with an increase in the temperature of the engine coolant measured by the engine-coolant temperature sensor 53, and/or in the temperature of intake air measured by the intake temperature sensor 55.

The phrase "the fuel-supply increasing unit 63 continuously performs the mixture-rich task for the selected abnormal-combustion cylinder several times" means that the fuel-supply increasing unit 63 causes the air-fuel mixture in the selected abnormal-combustion cylinder to be rich continuous several operating cycles of the engine 1 even if there are several abnormal-combustion cylinders. As described above, one operating cycle of the engine 1 corresponds to four-stroke cycle thereof, in other words, two rotations of the crankshaft of the engine 1.

The phrase "the fuel-supply increasing unit 63 discontinuously performs the mixture-rich task for the selected abnormal-combustion cylinder several times" means that the fuel-supply increasing unit 63 causes the air-fuel mixture in a selected one of the abnormal-combustion cylinders to be rich every one operating cycle of the engine 1 until the number of times the mixture-rich task for each of the abnormal-combustion cylinders is executed has reached the determined number of times.

This makes it possible for the fuel-supply increasing unit 63 to perform the mixture-rich task for at least one abnormal-combustion cylinder continuous several operating cycles of the engine 1, or perform the mixture-rich task for the at least one abnormal-combustion cylinder during one operating cycle of the engine 1 while performing an increase in a quantity of fuel to be sprayed exclusively into the at least one abnormal-combustion cylinder.

For example, the fuel-supply increasing unit 63 can determine whether to continuously or discontinuously perform the mixture-rich task for the selected abnormal-combustion cylinder as a function of: the level of abnormal combustion in the selected abnormal-combustion cylinder;

the temperature of the engine coolant measured by the engine-coolant temperature sensor 53; and/or the temperature of intake air measured by the intake temperature sensor 55.

In step S43, the ECM 60 serves as the fuel-supply increasing unit 63 to select, based on the unique information, i.e. the unique number, about at least one abnormal-combustion cylinder stored in the storage unit 66, an abnormal-combustion cylinder with the air-fuel mixture therein being scheduled to be rich. Then, in step S43, the ECM 60 serves as the fuel-supply increasing unit 63 to determine how to cause the air-fuel mixture in the selected abnormal-combustion cylinder to be rich, and thereafter, the abnormal-combustion suppressing routine proceeds to step S44 in place of step S5 set forth above.

If the unique information about a single abnormal-combustion cylinder is stored in the storage unit 66, the fuel-supply increasing unit 63 selects the single abnormal-combustion cylinder in step S42.

On the other hand, if pieces of unique information, such as unique numbers, about several abnormal-combustion cylinders are stored in the storage unit 66, the fuel-supply increasing unit 63 selects the several abnormal-combustion cylinders, i.e. their unique numbers, in the firing order of the several abnormal-combustion cylinders. Specifically, the firing order means the order in which the cylinders should be fired.

In step S43, the fuel-supply increasing unit 63 determines how to cause the air-fuel mixture in the selected abnormal-combustion cylinder to be rich in the same procedure as the operation in step S42.

For example, the fuel-supply increasing unit 63 determines the number of times to perform the mixture-rich task for the selected abnormal-combustion cylinder set forth above as a function of: the level of abnormal combustion in the selected abnormal-combustion cylinder; the temperature of the engine coolant measured by the engine-coolant temperature sensor 53; and/or the temperature of intake air measured by the intake temperature sensor 55 in step S43. In step S43, the fuel-supply increasing unit 63 determines whether to continuously or discontinuously perform the mixture-rich task for the selected abnormal-combustion cylinder continuous several operating cycles of the engine 1 in the same procedure as the operation in step S42.

In step S44, the ECM 60 serves as the fuel-supply increasing unit 63 to perform the mixture-rich task for an abnormal-combustion cylinder selected in step S42 or step S43 in accordance with the information about how to perform the mixture-rich task for the selected abnormal-combustion cylinder. Specifically, in step S44, the fuel-supply increasing unit 63 increases a quantity of fuel to be sprayed into one abnormal-combustion cylinder from a corresponding injector 16 during one operating cycle of the engine 1 while preventing an increase in a quantity of fuel to be sprayed into the other abnormal-combustion cylinders from the corresponding injectors 16. In other words, in step S44, the fuel-supply increasing unit 63 performs an increase in a quantity of fuel to be sprayed exclusively into a selected abnormal-combustion cylinder.

Other structures and functions of the system according to this embodiment will be substantially identical to those of the system according to the first or second embodiment.

If there are several abnormal-combustion cylinders, the system for controlling combustion conditions in the engine 1 according to this embodiment is configured to:

perform the mixture-rich task for the respective abnormal-combustion cylinders in the descending order of the levels of abnormal combustion in the respective abnormal-combustion cylinders or in the firing order of the abnormal-combustion cylinders in accordance with the information correlating with, for example, the levels of abnormal combustion in the abnormal-combustion cylinders, i.e. the information about whether to continuously or discontinuously perform the mixture-rich task for each of the abnormal-combustion cylinders.

This configuration increases a quantity of fuel to be sprayed into the abnormal-combustion cylinders for reducing the duration of abnormal combustion in the abnormal-combustion cylinders in the descending order of the levels of abnormal combustion in the abnormal-combustion cylinders or in the firing order of the abnormal-combustion cylinders. This makes it possible to reduce the durations of abnormal combustion in the abnormal-combustion cylinders in a proper order of the abnormal-combustion cylinders.

In each of the first to third embodiments, the ECM 60 and the sensors 51 to 56 serve as the system for controlling combustion conditions in the engine 1.

In the third embodiment, the system is configured to determine the number of times, i.e. the number of the operating cycles of the engine 1, to perform the mixture-rich task for a selected abnormal-combustion cylinder as a function of the level of abnormal combustion in the selected abnormal combustion cylinder, the temperature of the engine coolant measured by the engine-coolant temperature sensor 53, and/or the temperature of intake air measured by the intake temperature sensor 55. However, each of the first to third embodiments is not limited to the configuration that determines the period to execute the mixture-rich task for a selected abnormal-combustion cylinder in operating cycles of the engine 1.

Specifically, the system according to each of the first to third embodiments can be configured to increase the period to execute the mixture-rich task for a selected abnormal-combustion cylinder with an increase in the level of abnormal combustion in the selected abnormal-combustion cylinder, an increase in the temperature of the engine coolant measured by the engine-coolant temperature sensor 53, and/or an increase in temperature of intake air measured by the intake temperature sensor 55.

In each of the first to third embodiments, the system for controlling combustion conditions in the engine 1 is configured to determine whether the level of the vehicle vibrations due to the engine vibrations has reached a predetermined level using the vehicle acceleration sensor 52 and the engine speed sensor 54. However, each of the first to third embodiments is not limited to the configuration. Specifically, the system according to each of the first to third embodiments can be configured to determine whether the level of the vehicle vibrations due to the engine vibrations has reached a predetermined level using at least one of the remaining sensors installed in the vehicle other than the vehicle acceleration sensor 52 and the engine speed sensor 54.

In each of the first to third embodiments, the system for controlling combustion conditions in the engine 1 is configured to determine whether the level of the vehicle vibrations has reached a predetermined level using the vehicle acceleration sensor 52 and the engine speed sensor 54. However, each of the first to third embodiments is not limited to the configuration. Specifically, the system according to each of the first to third embodiments can be configured to determine whether the level of the vehicle vibrations has reached a predetermined level using one of the vehicle acceleration sensor 52 and the engine speed sensor 54. This configuration is effective if one of the vehicle acceleration sensor 52 and the engine speed sensor 54 is incorporated in the vehicle.

In each of the first to third embodiments, the system is configured to determine whether abnormal combustion takes place in each cylinder based on the measured signals sent from the knocking sensors 56, but each of the first to third embodiments is not limited thereto. Specifically, the system according to each of the first to third embodiments can be equipped with an ion current sensor 81 provided for each cylinder as illustrated in FIG. 2. For example, the ion current sensor 81 provided for a cylinder is electrically connected to the ignition coil 6, the corresponding spark plug, and the ECM 60. The ion current sensor 81 is, for example, operative to apply a measurement voltage between the center electrode and the ground electrode of the spark plug via the ignition coil 6 to cause ion currents to be generated through the ignition coil 6 during combustion of the air-fuel mixture in the combustion chamber of the cylinder. The ion current sensor 81 is operative to monitor the generated ion currents, and output the monitored ion currents to the ECM 60. The ECM 60 is configured to determine whether abnormal combustion, such as knocking and pre-ignition, takes place in the combustion chamber of the cylinder based on the monitored ion currents (see step S1 of FIG. 3). The ion current sensor 81 can be eliminated from the system if the knocking sensors are used to determine whether abnormal combustion takes place in the combustion chamber of the cylinder.

In each of the first to third embodiments, the ECM 60 can be configured to control the intake WT actuators 31 to delay the closing timing of the intake valve member for at least one abnormal-combustion cylinder relative to a normal closing timing of the same intake valve member for the same cylinder in which no abnormal combustion takes place. In this modification, for example, the ECM 60 can be configured to:

perform the task to delay the closing-timing of the intake valve member for at least one abnormal-combustion cylinder before performing the mixture-rich task therefor in step S5, and perform the mixture-rich task for the at least one abnormal-combustion cylinder only when the task to delay the closing-timing of the intake valve member for the at least one abnormal-combustion cylinder cannot sufficiently suppress abnormal combustion in the at least one abnormal-combustion cylinder.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A system for controlling a combustion condition in at least one cylinder of an internal combustion engine of a vehicle, the system comprising:

an abnormal combustion determiner configured to determine whether abnormal combustion takes place in the at least one cylinder;

a fuel supply increasing unit configured to increase, upon determination that abnormal combustion takes place in the at least one cylinder, a quantity of fuel to be supplied into the at least one cylinder in comparison to a quantity of fuel to be supplied into the same cylinder in which no abnormal combustion takes place;

a vibration determiner configured to determine whether a level of vibrations of the vehicle has reached a predetermined level; and a disabling unit configured to disable, upon determination that the level of vibrations of the vehicle has reached the predetermined level while the fuel supply increasing unit is increasing the quantity of fuel to be supplied into the at least one cylinder, the fuel supply increasing unit from increasing the quantity of fuel to be supplied into the at least one cylinder.

2. The system according to claim 1, wherein the at least one cylinder of the internal combustion engine is a plurality of cylinders in the internal combustion engine, the internal combustion engine has repeated operating cycles, the abnormal combustion determiner is configured to determine that abnormal combustion takes place in several cylinders, referred to as abnormal-combustion cylinders, in the plurality of cylinders, and the fuel supply increasing unit is configured to:

sequentially selects one of the abnormal-combustion cylinders in a given order; and increase the quantity of fuel to be supplied into a sequentially selected one the abnormal-combustion cylinders every operating cycle of the internal combustion engine.

3. The system according to claim 1, wherein the at least one cylinder is a plurality of cylinders in the internal combustion engine, the vehicle is configured such that each of the plurality of cylinders of the internal combustion engine is communicable to an exhaust manifold, the exhaust manifold is communicably coupled to an exhaust passage, and catalyst is disposed in the exhaust passage, the system further comprising:

a fuel supply reducing unit configured to reduce a quantity of fuel to be supplied into at least one remaining cylinder in the plurality of cylinders other than the selected cylinder into which the quantity of fuel to be supplied is increased by the fuel supply increasing unit, so that an air-fuel ratio of exhaust gas out of the plurality of cylinders in the exhaust passage becomes an ideal air-fuel ratio.

4. The system according to claim 3, wherein, if the at least one remaining cylinder in the plurality of cylinders other than the selected cylinder is several remaining cylinders thereof other than the selected cylinder, the fuel supply reducing unit is configured to reduce the quantity of fuel to be supplied into each of the several remaining cylinders equally.

5. The system according to claim 1, wherein the at least one cylinder is a plurality of cylinders in the internal combustion engine, and the abnormal combustion determiner is configured to determine that abnormal combustion takes place in several cylinders, referred to as abnormal-combustion cylinders, in the plurality of cylinders, the system further comprising:

an abnormal-combustion level detector configured to detect a level of abnormal combustion in each of the abnormal-combustion cylinders, the fuel supply increasing unit being configured to increase the quantity of fuel to be supplied into the abnormal-combustion cylinders in one of:

a firing order of the abnormal-combustion cylinders of the internal combustion engine; and a descending order of the levels of abnormal combustion detected by the abnormal-combustion level detector.

6. The system according to claim 1, further comprising:

an abnormal-combustion level detector configured to detect a level of abnormal combustion in the at least one cylinder, wherein the fuel supply increasing unit is configured to extend a period to increase the quantity of fuel to be supplied into the at least one cylinder as the level of abnormal combustion in the at least one cylinder detected by the abnormal-combustion level detector increases.

7. The system according to claim 1, further comprising:

a coolant temperature sensor configured to measure a temperature of a coolant in the internal combustion engine, wherein the fuel supply increasing unit is configured to extend a period to increase the quantity of fuel to be supplied into the at least one cylinder as the temperature of the coolant in the internal combustion engine increases.

8. The system according to claim 1, further comprising:

an intake temperature sensor configured to measure a temperature of intake air to the internal combustion engine, wherein the fuel supply increasing unit is configured to extend a period to increase the quantity of fuel to be supplied into the at least one cylinder as the temperature of the intake air increases.

9. The system according to claim 6, wherein the internal combustion engine has repeated operating cycles, and the fuel supply increasing unit is configured to increase the quantity of fuel to be supplied into the at least one cylinder during continuous several operating cycles of the internal combustion engine, thus extending a period to increase the quantity of fuel to be supplied into the at least one cylinder.

10. The system according to claim 1, further comprising:

an acceleration determiner configured to determine whether an acceleration of the vehicle while the vehicle is running is smaller than a predetermined threshold, wherein:

upon determination that the acceleration of the vehicle while the vehicle is running is smaller than the predetermined threshold, the fuel supply increasing unit is configured to avoid an increase in the quantity of fuel to be supplied into the at least one cylinder.

11. The system according to claim 1, wherein the disabling unit is configured to disable the fuel supply increasing unit when the level of vibrations exceeds the predetermined threshold.

12. The system according to claim 11, wherein the vibration determiner is configured to determine the level of vibrations based upon a measured signal from a vehicle acceleration sensor and the predetermined threshold is an acceleration threshold.

13. The system according to claim 11, wherein the vibration determiner is configured to determine the level of vibrations based upon a rate of change in engine speed and the predetermined threshold is a rate of change in engine speed threshold.

14. A system according to claim 1, wherein the vibration determiner is configured to determine whether a vehicle acceleration value exceeds an acceleration threshold;

wherein the vibration determiner is further configured to determine whether a rate of change of engine speed exceeds a rate of change of engine speed threshold; and wherein the disabling unit is configured to disable the fuel supply increasing unit when the vehicle acceleration value exceeds the acceleration threshold or when the rate of change of engine speed exceeds the rate of change of engine speed threshold.

\* \* \* \* \*